United States Patent Office 3,466,428
Patented Sept. 9, 1969

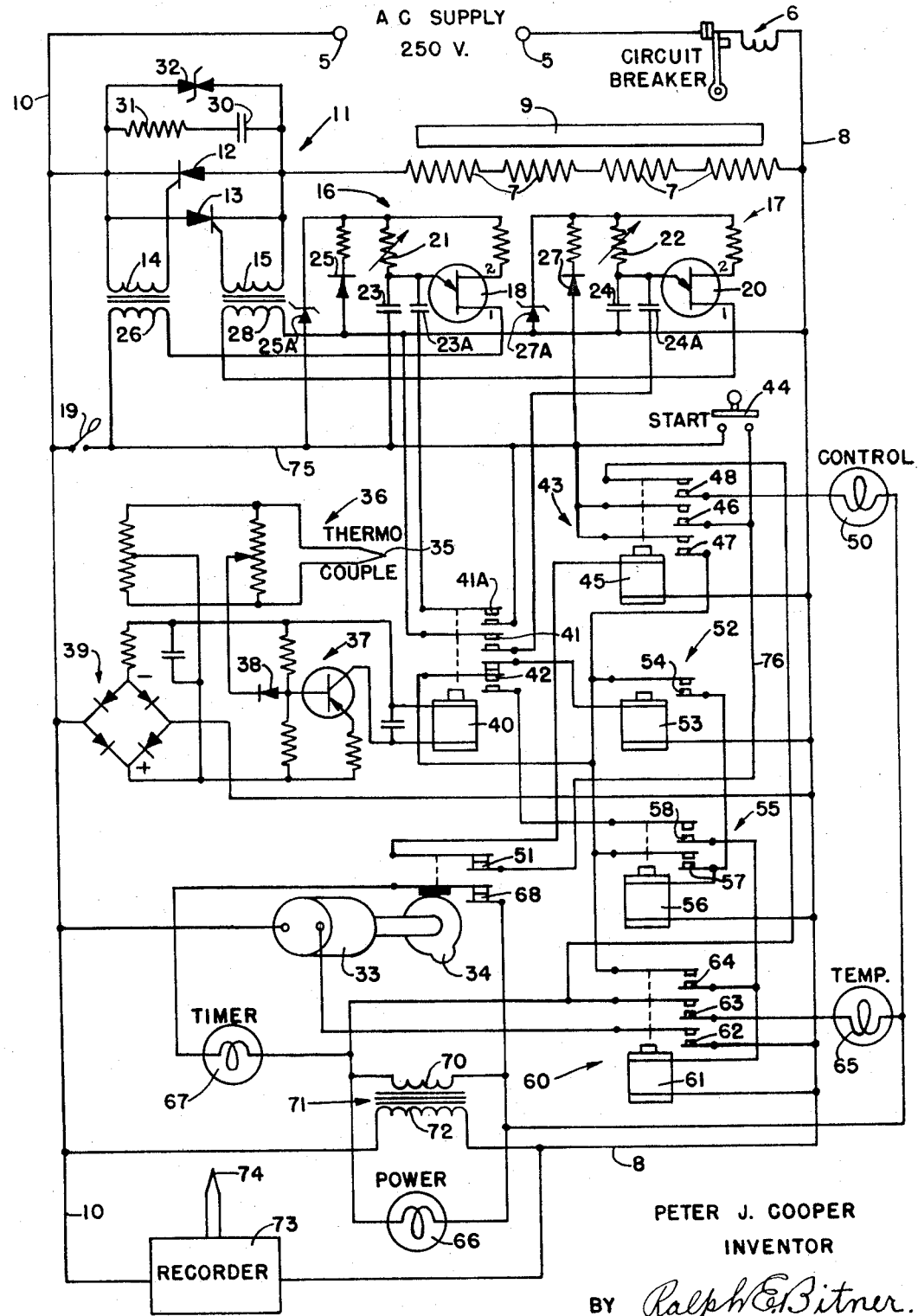

3,466,428
CONTROL CIRCUIT FOR ELECTRIC HEATER
Peter James Cooper, 61 Sandown Court, Lord St.,
Southport, England
Filed Jan. 4, 1968, Ser. No. 695,798
Int. Cl. H05b 1/02
U.S. Cl. 219—501                                10 Claims

ABSTRACT OF THE DISCLOSURE

A control circuit is described which regulates an alternating current power supply to produce a desired temperature of an object positioned adjacent to an electric heater. The temperature is sensed by a thermocouple and a plurality of relays control the current to maintain the temperature at a predetermined value for a set period. An adjustable timer normalizes the circuit at the end of the period.

Background of the invention

This invention relates to a heater control circuit which applies alternating current power directly to a series of electric heating units to condition a metal object. The invention is directed primarily to the stress reduction of a weld in a metal pipe but the control circuit can be used in many other applications.

Many current control devices have been designed and used for controlling the temperature of an electric furnace. Generally, when these units are used to control large amounts of power, a heavy step down transformer must be employed. Other current control devices have included variable inductors, current contactors, and variable magnetic core devices as part of a transformer. The present system uses none of these devices but instead employs a pair of semiconductor components which act to clip a portion of each cycle of the applied AC power and thereby control the heating units. The semiconductor components (unijunction transistors) are controlled by an RC circuit to clip both the positive and negative halves of the AC wave, the timing of such clipping action being determined by a relay whose winding is coupled to a temperature sensing thermocouple.

For a better understanding of the present invention, together with other details and features thereof, reference is made to the following description taken in connection with the accompanying drawings.

Brief description of the figure

The figure is a schematic diagram of connections of the entire control circuit, indicating the heater units, the clipping circuit, the temperature sensing circuit, and five relays.

Description of the preferred embodiment

The circuit includes a pair of power terminals 5, 5 which are to be connected to a 250 volt supply line. A circuit breaker 6 is connected in series with one power conductor in the event of a short or accidental overload. Heater units 7 are connected across powerc onductors 8 and 10 in series with a clipping circuit 11. The clipping circuit comprises two silicon controlled rectifiers 12 and 13, each having a firing electrode for initiating conductance during a portion of the alternating current wave. The firing electrodes are respectively connected to the rectifier cathodes in series with the secondary windings 14, 15 of two firing transformers.

The timing means, which controls the clipping action, includes two discharge circuits 16 and 17, each containing a unijunction transistor, 18, 20 (double based diode), an adjustable input resistor 21, 22, and a storage capacitor 23, 24. Discharge circuit 16 receives its input through a diode 25 which passes only the positive halves of the AC wave. The timed pulses produced by this circuit are applied from base 1 of transistor 18 to the primary winding 26. In a similar manner, discharge circuit 17 receives its input through diode 27 which passes only the negative halves of the AC wave. The timed pulses produced by this circuit are applied from base 1 of transistor 20 to the primary winding 28. Zener diodes 25A and 27A clip the tops of the AC pulses to increase the duration of the pulse control units.

During the switching operations of the circuit breaker and other units, high voltage transient pulses may be generated. The smaller transient waves are absorbed by a shunt circuit including capacitor 30 and resistor 31. The larger transients are passed by a double Zener diode 32, connected across the clipping circuit 11. The action of the clipping circuit is well known and has been described in books and journals. As the amplitude of the positive half of the wave increases, capacitors 23 are charged through resistor 21. When a predetermined voltage is reached, the transistor 18 conducts and sends a pulse to the silicon controlled rectifier 12 to make it conductive. This action permits a measured current to pass through the heaters 7. The same action occurs on the negative halves of the cycle when circuit 17 controls the timing.

The circuit which controls the starting, stopping, temperature, and interval timing includes five relays and a timing device which includes an electric motor 33, and a cam 34. The position of the cam is set manually at the start of the operation to control the soaking period.

The temperature of the heated object 9, which may be a weld, is determined by one or more thermocouples 35 connected to a bridge circuit 36. The opposite junction points of the bridge are connected to the input terminals of an amplifier 37 in series with a diode 38. The output terminals are connected to the winding 40 of a relay having two pairs of normally open contacts 41, 41A and another contact means 42 which controls other relays, the operation of which will be described later. The amplifier circuit receives its direct current power from a bridge rectifier 39.

A start relay 43 is operated by a manual start switch 44 and includes a winding 45, a normally open pair of latching contacts 46, a normally open pair of operating contacts 47, and a pair of contacts 48 which controls the current to an indicator lamp 50. The relay winding 45 is connected in series with a pair of normally closed unlatch contacts 51, operated by the timer cam 34, and the latching contacts 46.

A first heater relay 52 includes a winding 53 and a pair of normally open contacts 54. This relay is controlled by contacts 42, operated by winding 40, and the thermocouple 35. A second heater relay 55 includes a winding 56 and two pairs of normally open contacts 57 and 58. Contacts 57 are latching contacts. The relay winding 56 is connected in series with contacts 54 on relay 52 and contacts 47 on relay 43.

A timer relay 60 includes a winding 61 and three normally open contacts 62, 63, and 64. Contacts 62 operate the timer motor 33. Contacts 63 light a lamp 65 which indicates that the timer motor has been started. It also indicates that a desired temperature of the heated object 9 has been reached. Contacts 64 are latching contacts and retain relay 60 in its actuated condition after contacts 42 have been normalized.

Four indicator lamps 50, 65, 66, and 67 are employed to show an operator the condition of the circuit. Lamps 50 and 65 have been described above. Lamp 66 indicates that the system is supplied with power. It is lighted when the circuit breaker 6 is closed. Lamp 67 is in series with contacts 68 and is lighted during the time that the timer cam 34 is not in its final position. It is obvious that contacts 68 can be changed to a pair of normally open contacts and then the timer lamp 67 will be off until cam 34 is in its final position. Then a lighted lamp indicates the end of a soaking or stress relieving period. All the indicating lamps are 24 volt lamps and are connected to a secondary winding 70 of a transformer 71 having a primary winding 72 connected across power conductors 8, 10.

In order to provide a permanent record of a heating operation, a recorder 73 is connected across the power conductors 8, 10 for running a motorized clock which feeds graph paper under a recording stylus. The stylus is coupled to a thermocouple 74 which is connected to the heated object 9.

Operation

The circuit is shown in its normal condition except that the circuit breaker is closed and lamp 66 is lighted. The operator first moves cam 34 to a position where a desired soaking time interval is indicated. Lamp 67 is lighted as soon as contacts 68 are closed. At this time no current flows through the heater units 7 and the silicon controlled rectifiers because the rectifiers are non-conducting. Also, at this time no control pulses are produced by discharge circuits 16 and 17 because switch 19 is open and capacitors 23 and 24 cannot charge. The current is started through the heaters by closing switch 19 and the rest of the circuit is activated by a momentary closure of start switch 44. When switch 44 is closed, current flows over conductor 75, through the start switch 44, over conductor 76, through normally closed contacts 51 on the timer, then through winding 45, to the other power conductor 8. The start relay 43 is actuated and all three contact pairs are closed. After start switch 44 is opened, the relay remains in its actuated condition because of closed contacts 46 which are connected across the contacts of the start switch 44. At this time the control indicator lamp 50 is lighted.

When contacts 47 on the start relay are closed, a circuit is completed from conductor 75, through contacts 47, the upper pair of contacts of 42, through first heater relay winding 53, to the other power conductor 8. This current actuates relay 52, closes contacts 54, and sends current through the second heater relay winding 56 thereby closing contacts 57 and 58. No current flows through contacts 58 at this time because the lower part of contacts 42 is open. Contacts 57 are latching contacts and hold relay 55 in its actuated condition after contacts 54 on relay 52 are opened.

With relays 43, 52, and 55 in their actuated condition and switch 19 closed, a maximum current flows through the heater units 7 to raise the temperature of the heated object 9. When the proper temperature is reached, thermocouple 35 sends current through diode 38 to the amplifier unit 37, relay winding 40 receives current and contacts 41 and 41A are closed. At the same time relay armature changes the position of contacts 42, opening the upper pair and closing the lower pair.

When contacts 41 and 41A are closed, capacitors 23A and 24A are respectively connected in parallel with capacitors 23 and 24. The additional capacity increases the charging period and reduces the time interval for conduction by controlled rectifiers 12 and 13. The result is a lower current through the heater units 7 and the temperature of the object and thermocouple 35 is lowered slowly. When the lower pair of contacts 42 is closed, a circuit is completed which can be traced from power conductor 75, through closed contacts 47, then through the lower pair of contacts 42, contacts 58 on relay 55 and through winding 61 of the timer relay 60 to the other power conductor 8. This current actuated relay 60 and closes contacts 62, 63, and 64. Contacts 64 are latching contacts and retain relay 60 in its actuated condition even if the lower contacts 42 are opened. The latching circuit is broken when contacts 58 are opened. Contacts 63 on relay 60 connect indicator lamp 65 to the 24 volt secondary winding 70 to indicate that the heated object is at its desired soaking temperature.

When contacts 62 are closed, the timer motor 33 is connected to power conductors 8 and 10. The motor starts and moves cam 34 toward its contact opening position. A reduction gear (not shown) is built integral with the motor so that cam 34 moves very slowly. For most applications the timer is set to run for an hour or more before breaking contacts 68 and 51. Contacts 68 are connected in series with the timer indicator lamp 67 and secondary winding 70. Contacts 51 are in series with latching contacts 46 on relay 43 and when contacts 51 are opened, relay 43 is normalized.

The reduced current through the heater units 7 gradually reduces the temperature of the heated object and thermocouple 35. When the temperature is reduced below a critical value, the current through relay winding 40 is cut off and contacts 41, 41A, and 42 are normalized. The upper contact pair of contacts 42 actuates relay 52 and closes contacts 54 but this action has no effect at this time since relays 55 and 60 are in their actuated condition because of latching circuits. The opening of contacts 41 breaks connection to capacitors 23A and 24A, thereby lowering the charging time and increasing the current through the heater units 7.

The above described action continues, with contacts 41 and 41A opening and closing to raise and lower the current through the heater units to maintain the average temperature of the heated object at a desired value. The desired value may be adjusted by changing resistors 21 and 22. A single control knob (not shown) is coupled to both variable resistors for convenience of operation. During the soaking period, while the stresses are being relieved in a weld, relays 43, 53, and 60 are all retained in their actuated position by latching circuits and the timer motor 33 continues to turn the cam 34 toward its contact breaking position.

At the end of the soaking period, cam 34 opens contacts 51 and 68. Contacts 68 open the current to the indicator lamp 67 to give notice that the period has expired. Contacts 51 are in series with the latching circuit of relay 43 and when these contacts are opened, the relay 43 is normalized. Contacts 47 on relay 43 are in series with the latching contacts 57 of relay 55 so, when contacts 47 are opened, relay 55 is normalized. In a like manner, contacts 47 are also in series with the latching contacts 64 of the timer relay 60 and when contacts 47 are opened, relay 60 is normalized. When relay 60 is normalized, contacts 62 are opened and the timer motor stops, still holding contacts 51 and 68 open. At this time the thermocouple 35 and its associated circuit acts to regulate the current through the heater units 7. The extinction of lamp 67 notifies the operator that the cycle is complete and the operator then trips circuit breaker 6 cutting off all power to the circuit. The circuit is now ready for another cycle of operations.

It is obvious from the above description that the circuit breaker 6 may be tripped automatically, either by the timer cam 34 or by adding another contact to relay 60.

The foregoing disclosure and drawings are merely illustrative of the principles of this invention and are not to be interpreted in a limiting sense. The only limitations are to be determined from the scope of the appended claims.

I claim:

1. A control circuit for an electrical heater comprising; terminals for connection to a source of alternating current power; a resistance heater for raising the temperature of an object; a first controlled rectifier connected in series between the terminals and the heater for passing alternating current pulses of one polarity; a second controlled rectifier connected in parallel with the first for passing alternating current pulses of the opposite polarity; each of said controlled rectifiers having an anode, a cathode, and a firing electrode; two unijunction transistor circuits each coupled respectively to the firing electrode of said first and second rectifiers; each of said unijunction circuits including a first storage capacitor for discharging through the transistor and producing a control pulse which fires the rectifiers and permits a desired current to flow through the rectifiers and heaters; each of said unijunction circuits also including a second storage capacitor which may be connected in parallel with the first storage capacitor for producing a similar control for firing the rectifiers and permitting a reduced current to flow through the rectifiers and heaters; a thermocouple adapted to be placed in contact with the object to be heated for generating a direct current voltage proportional to the temperature of the object; switching means responsive to said thermocouple voltage for selectively connecting the second storage capacitors in parallel with the first storage capacitors for lowering the heating current when the thermocouple senses an object temperature greater than a predetermined value and for disconnecting the second storage capacitors when the temperature is less than a predetermined value.

2. A control circuit as claimed in claim 1 wherein a settable timer mechanism includes an electric motor coupled to a rotatable cam for opening contacts connected in series with the winding of a latchable start relay for normalizing the relay and for giving a visual indication that the heating cycle has been completed.

3. A control circuit as claimed in claim 1 wherein each unijunction transistor circuit is connected in series with a diode to receive only the positive halves of the AC wave and to permit the second unijunction transistor circuit to receive only the negative halves of the AC wave.

4. A control circuit as claimed in claim 1 wherein each of said unijunction transistor circuits includes a charging circuit comprising a variable resistor in series with said charging capacitor, said variable resistor for varying the charging rate of the storage capacitor.

5. A control circuit as claimed in claim 1 wherein the coupling means between the thermocouple and the switching means includes a four-armed bridge circuit having at least one adjustable arm.

6. A control circuit as claimed in claim 1 wherein the coupling means between the thermocouple and the switching means includes a diode rectifier and a transistor amplifier.

7. A control circuit as claimed in claim 6 wherein the transistor amplifier is connected to a relay winding which operates a relay armature and said switching means.

8. A control circuit as claimed in claim 1 wherein a manual start switch and a relay latching circuit maintain the heater units connected to the power lines until the latching circuit is opened.

9. A control circuit as claimed in claim 8 wherein a timer motor is coupled to a normally closed pair of contacts in series with said latching circuit for opening the contacts and thereby disconnecting the power lines from the heater units after a predetermined time interval has elapsed, said time interval adapted to start after the temperature of the object has been raised to a predetermined value.

10. A control circuit as claimed in claim 9 wherein said timer motor is connected to the AC power at the time the heater units raise the temperature of the object to a predetermined value, said connection being made by a pair of relay contacts, the relay winding being coupled to said thermocouple.

References Cited

UNITED STATES PATENTS

| | | | |
|---|---|---|---|
| 3,275,802 | 9/1966 | Vandivere et al. | 219—581 |
| 3,385,957 | 5/1968 | Munson et al. | 219—501 |
| 3,235,711 | 2/1966 | Bergen et al. | 219—501 |
| 3,259,825 | 7/1966 | Sames | 219—501 |

G. HARRIS, Primary Examiner

F. E. BELL, Assistant Examiner